(12) United States Patent
Svensson et al.

(10) Patent No.: US 10,316,734 B2
(45) Date of Patent: Jun. 11, 2019

(54) PISTON AND CYLINDER FEATURES FOR ENHANCED SQUISH FLOW

(71) Applicant: Caterpillar Inc., Peoria, IL (US)

(72) Inventors: Kenth Svensson, Peoria, IL (US); Chad Palmer Koci, Washington, IL (US)

(73) Assignee: Caterpillar Inc., Deerfield, IL (US)

(*) Notice: Subject to any disclaimer, the term of this patent is extended or adjusted under 35 U.S.C. 154(b) by 233 days.

(21) Appl. No.: 15/286,334

(22) Filed: Oct. 5, 2016

(65) Prior Publication Data
US 2018/0094569 A1 Apr. 5, 2018

(51) Int. Cl.
F02B 23/06 (2006.01)
F02F 3/24 (2006.01)

(52) U.S. Cl.
CPC ...... F02B 23/0696 (2013.01); F02B 23/0621 (2013.01); F02F 3/24 (2013.01); F02B 2275/40 (2013.01); Y02T 10/125 (2013.01)

(58) Field of Classification Search
CPC .............. F02B 23/0696; F02B 23/0621; F02B 2274/40; F02F 3/24; F02F 3/26; F02F 3/28; F16J 1/09
See application file for complete search history.

(56) References Cited

U.S. PATENT DOCUMENTS

| | | | | |
|---|---|---|---|---|
| 2,738,782 A * | 3/1956 | Bodine, Jr. | ............. | F02B 23/08 123/193.6 |
| 4,175,531 A * | 11/1979 | Tanahashi | ........... | F02B 19/1028 123/193.6 |
| 4,572,123 A | 2/1986 | Evans | | |
| 4,898,135 A * | 2/1990 | Failla | ....................... | F02B 21/02 123/193.6 |
| 5,103,784 A * | 4/1992 | Evans | ..................... | F02B 23/08 123/263 |
| 5,322,042 A * | 6/1994 | di Priolo | ................. | F02B 19/14 123/193.6 |
| 5,819,700 A * | 10/1998 | Ueda | ....................... | F02B 23/08 123/262 |
| 5,927,244 A * | 7/1999 | Yamauchi | ............. | F02B 23/101 123/295 |
| 6,237,579 B1 * | 5/2001 | Singh | ....................... | F02B 19/12 123/193.5 |
| 6,494,178 B1 * | 12/2002 | Cleary | ................... | F02B 23/104 123/193.6 |

(Continued)

FOREIGN PATENT DOCUMENTS

GB 457192 A 8/1935
JP H03290020 A 1/1988

(Continued)

Primary Examiner — Grant Moubry
(74) Attorney, Agent, or Firm — Miller, Matthias & Hull

(57) ABSTRACT

An internal combustion engine includes an engine block having a cylinder, a cylinder head disposed on one end of the cylinder, a piston disposed within the cylinder, and a rim. A piston crown of the piston defines a piston bowl. The rim depends from at least one of the cylinder head and piston and is located radially inward from the piston crown. At least one of the piston crown and cylinder head defines a passageway that is configured to guide a squish flow from between the piston crown and cylinder head to the piston bowl to interact with a plurality of flames within the piston bowl to enhance combustion.

16 Claims, 5 Drawing Sheets

(56) References Cited

U.S. PATENT DOCUMENTS

| | | | | |
|---|---|---|---|---|
| 7,004,140 B2* | 2/2006 | Kim | ................... | F02B 23/0627 |
| | | | | 123/193.6 |
| 7,185,614 B2* | 3/2007 | Meffert | .............. | F02B 23/0672 |
| | | | | 123/269 |
| 8,056,532 B2* | 11/2011 | Shibata | .............. | F02B 23/0621 |
| | | | | 123/306 |
| 2015/0260081 A1* | 9/2015 | Morgan | ............. | F02B 23/0627 |
| | | | | 123/193.6 |
| 2017/0145899 A1* | 5/2017 | Singh | ................. | F02B 23/0675 |

FOREIGN PATENT DOCUMENTS

| | | |
|---|---|---|
| JP | S6318126 A | 1/1988 |
| JP | H06248953 A | 9/1994 |
| JP | H11229881 A | 8/1999 |

* cited by examiner

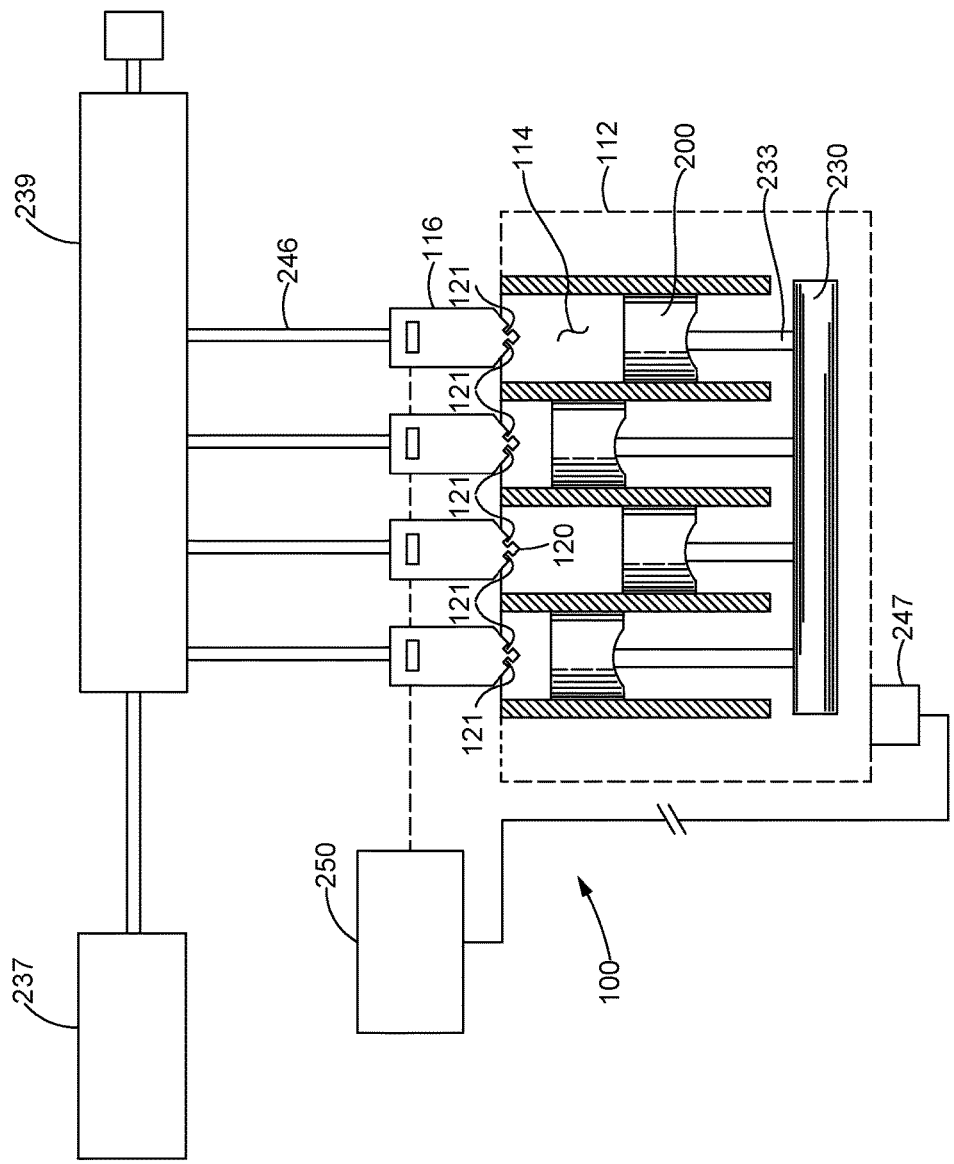

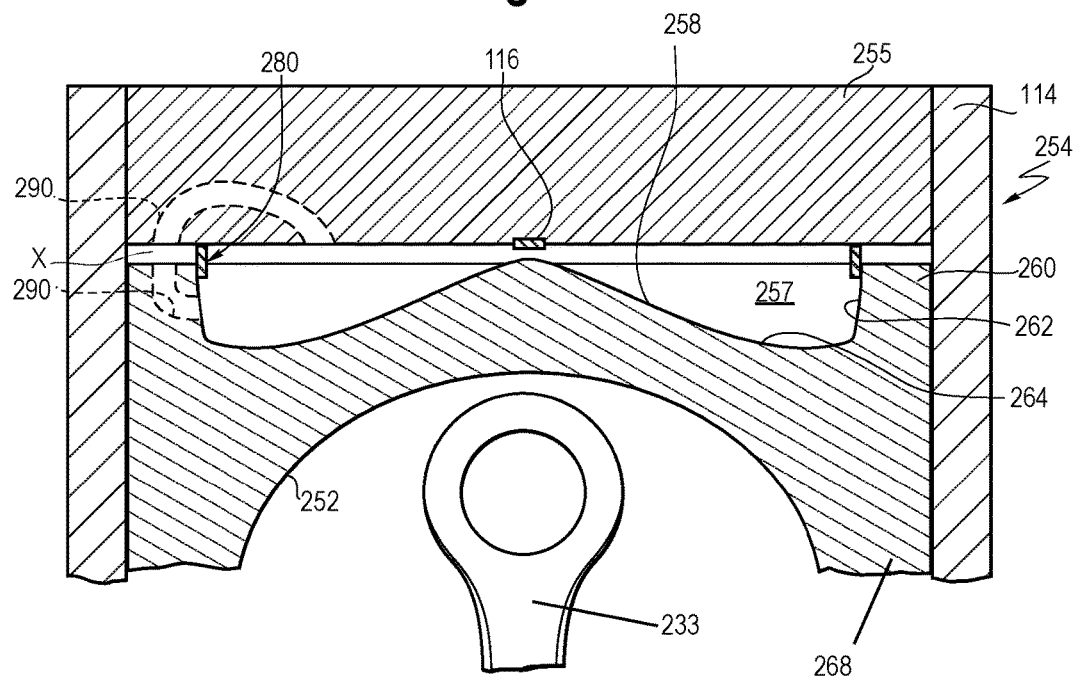
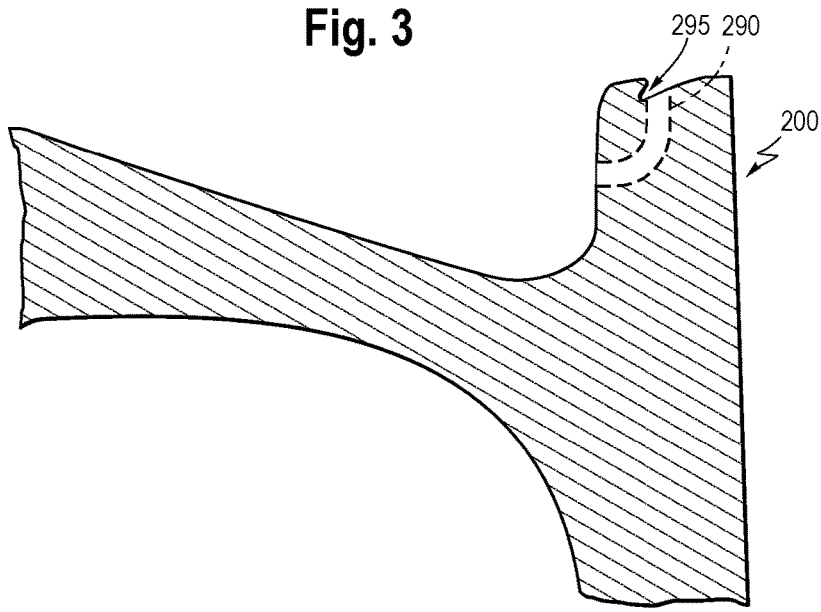

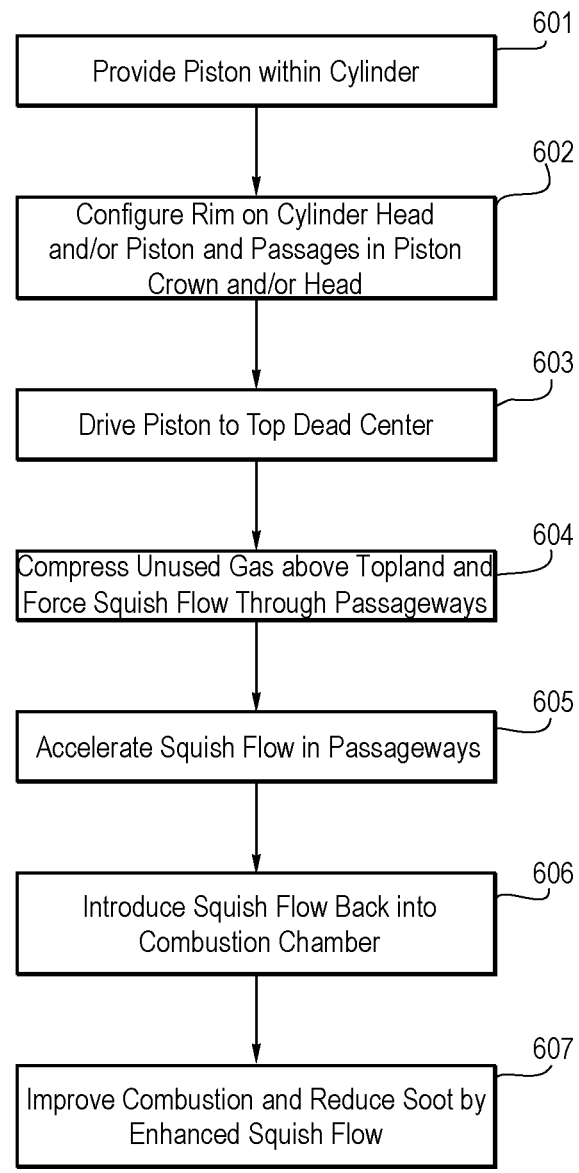

PISTON AND CYLINDER FEATURES FOR ENHANCED SQUISH FLOW

TECHNICAL FIELD

The present disclosure relates generally to internal combustion engines, and more particularly, relates to pistons and cylinders for internal combustion engines.

BACKGROUND

Internal combustion engines typically contain one or more pistons. The pistons reciprocate up and down in corresponding and complementarily shaped cylinders present within the internal combustion engines. Such engines are often Otto cycle engines which employ a spark plug or the like for ignition, or Diesel cycle engines which rely on compression ignition. After ignition, which may occur on either side of a top dead center (TDC) position, the piston descends within the cylinder in a power stroke before ascending for exhaust and then back down for intake in a repeating sequence.

The pistons of such engines typically include a cylindrical base that has a bottom portion connected to a crank shaft by a connecting rod or the like, and a top portion or piston crown opposite the bottom portion. The piston crown cooperates with the cylinder head to define a combustion chamber. It is within the combustion chamber that the air and fuel are mixed and ignited.

The piston crown is typically bowl-shaped and defined by a circumferential wall that extends from the cylindrical base of the piston. The circumferential wall of the piston may also be known as the piston bowl wall. A fuel injector is typically mounted in the cylinder head and extended into the combustion chamber to communicate fuel to the combustion chamber prior to ignition. As the piston arises within the cylinder toward a (TDC) position, a small volume of air and fuel for premixed engines, air only for diesel engines (diesel engines typically include external or internal recirculated exhaust gas (EGR) but could be air only), known as squish flow is squeezed out from between the piston crown and cylinder head and into the combustion chamber. Air can also include (EGR) that is inducted with the air on the intake stroke or trapped in the cylinder from the previous engine cycle.

A problem associated with squish flow is that it follows the path of least resistance and current engine designs may not use it optimally. More specifically, as the squish flow follows the path of least resistance, it does not actually mix with flame plumes in the combustion chamber and there may be an incomplete mixing of air and fuel. Consequently, a significant amount of unburned gas may be present in the combustion chamber, thereby not allowing for beneficial mixing of air and fuel, and ultimately making for a less efficient engine, and potentially increasing the amount of soot or other pollutants produced.

Various engine configurations exist to purportedly improve fuel and air mixing prior to, or during combustion. However, such configurations face the common challenge that the piston bowl is a fixed structure that does not capitalize on squish flow and thus may not ensure optimal mixing of air and fuel within the combustion chamber. For example, U.S. Patent Application No. 2015/0260081 entitled "Turbo Vortex Piston," discloses a piston for use in a four cycle reciprocating internal combustion engines. However, such a system does not have the capacity to reroute squish flowing away from the piston bowl back into the piston bowl to interact with the flame plumes flowing within the piston bowl. As a result, such systems do not effectively utilize squish flow to improve combustion and reduce soot emissions.

In view of the foregoing disadvantages associated with the mixture of air and fuel within engines, a need exits for a solution which provides for more interaction between the air and fuel to promote soot oxidation within the internal combustion engine. The present disclosure is directed at addressing one or more of the deficiencies and disadvantages set forth above. However, it should be appreciated that the solution of any particular problem is not a limitation on the scope of this disclosure or of the attached claims except to the extent expressly noted.

SUMMARY OF THE DISCLOSURE

In one aspect of the present disclosure, an internal combustion engine may include an engine block having a plurality of cylinders therein, with each cylinder being closed by a cylinder head. The internal combustion engine may also include a piston reciprocatingly mounted within each cylinder and defining a combustion chamber therebetween. The internal combustion engine may also include a fuel injector communicating fuel to the combustion chamber, the fuel creating a plurality of flames when ignited. Further, the internal combustion engine may include a piston crown extending from each piston and defining a piston bowl. In addition, the internal combustion engine may include a rim depending from at least one of the cylinder head and piston and being provided radially inward from the piston crown. The internal combustion engine may also include a passageway configured within at least one of the piston crown and cylinder head and adapted to guide a squish flow between the piston crown and cylinder head and back toward the piston bowl to interact with the plurality of flames within the piston bowl for enhanced combustion.

In a further aspect of the present disclosure, a piston is included. The piston may include a cylindrical base being closed by a cylinder head. Further, the piston may include a circumferential wall extending from the cylindrical base. In addition, the piston may include a piston bowl defined by the cylindrical base and the circumferential wall. The piston may also include a rim depending from at least one of the cylinder head and circumferential wall and being provided radially inward from the circumferential wall. Further, the piston may include a passageway configured within at least one of the piston and cylinder head and adapted to guide a squish flow from between the piston top land and cylinder head back toward the piston bowl.

In another aspect of the present disclosure, a method for operating an internal combustion engine is provided. The method may include providing a piston within a cylinder, wherein the piston and cylinder define a combustion chamber therebetween. The method may also include configuring a rim on at least one of a cylinder head and the piston and adding passageways in at least one of the piston and the cylinder head. Further, the method may include driving the piston to a top dead center position, and accelerating a squish flow through the passageways. The method may also include guiding the squish flow back into a combustion chamber from the passageway to exit to interact with a plurality of flames within the combustion chamber.

These and other aspects and features will be more readily understood when reading the following detailed description in conjunction with the accompanying drawings.

BRIEF DESCRIPTION OF THE DRAWINGS

FIG. 1 is a schematic, partially sectioned side view of an internal combustion engine in accordance with the present disclosure;

FIG. 2 is sectional view of a representative piston and cylinder combination according to the present disclosure;

FIG. 3 is an enlarged view of another embodiment of a piston with a topland groove in accordance with the present disclosure;

FIG. 6 is a flow chart depicting a sample sequence of steps in accordance with the present disclosure.

Figure 4:
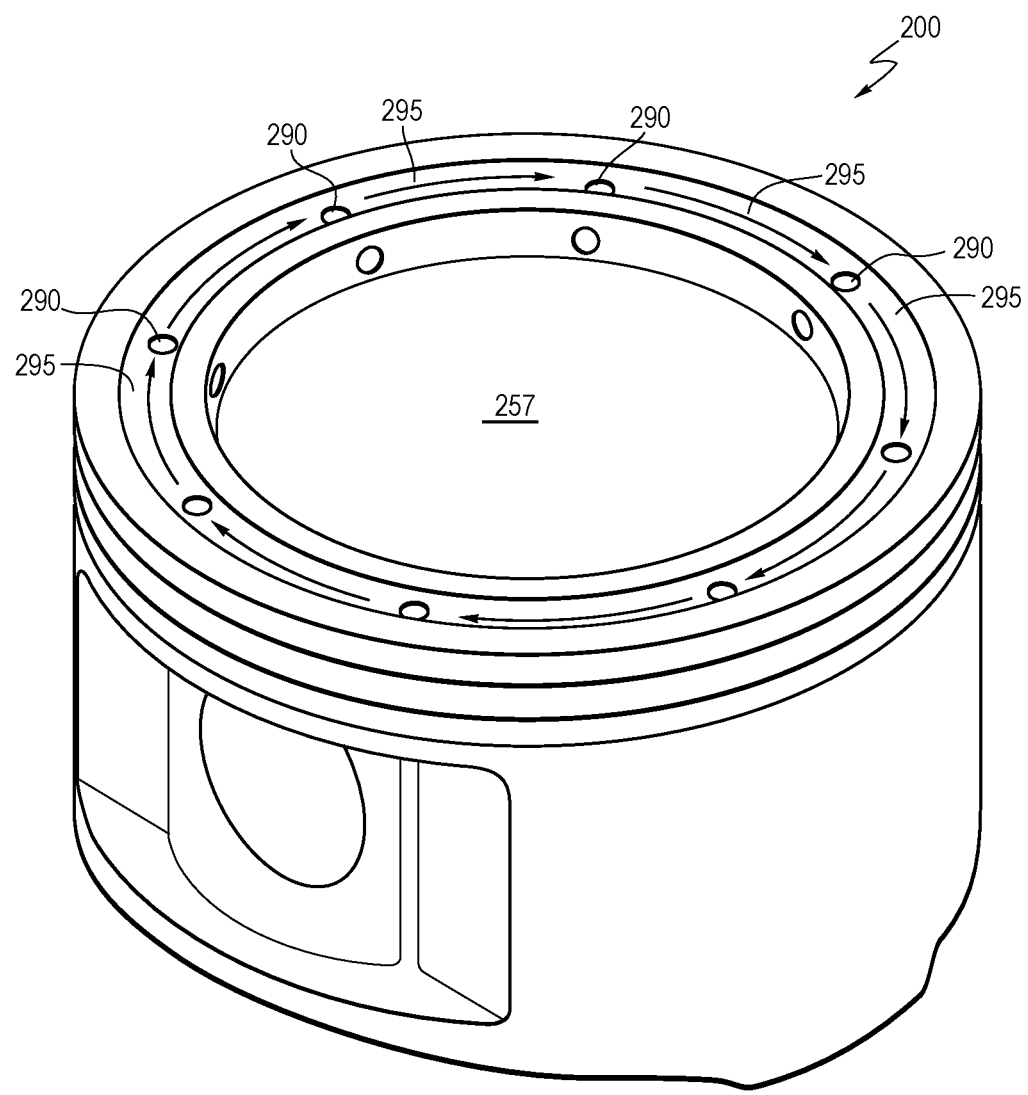
FIG. 4 is a perspective view of the piston of FIG. 3.

While the following detailed description is given with respect to certain illustrative embodiments, it is to be understood that such embodiments are not to be construed as limiting, but rather the present disclosure is entitled to a scope of protection consistent with all embodiments, modifications, alternative constructions, and equivalents thereto.

DETAILED DESCRIPTION

Referring now to the drawings and with specific reference to FIG. 1, an exemplary embodiment of an internal combustion engine 100 is depicted. With continued reference to FIG. 1, the internal combustion engine 100 is shown to include an engine block 112 with a plurality of cylinders 114 formed therein. Fuel injectors 116 may be disposed at more than one location relative to the block 112. The fuel injectors 116 may extend partially into each of the cylinders 114 to direct liquid fuel or the like therein. The fuel injectors 116 may include a fuel injector tip 120 with a plurality of orifices 121 that direct fuel in a plurality of radial directions into the associated cylinders 114.

The internal combustion engine 100 also includes a plurality of pistons 200 reciprocating within the plurality of cylinders 114. Each of the pistons 200 is movable to, among other things, increase cylinder pressures to a pressure sufficient to cause ignition of fuel as is well known in Diesel engines. Each piston 200 is coupled to a crankshaft 230 via a connecting rod 233 to cause rotation of the crankshaft 230. The internal combustion engine 100 may also include a fuel source 237. The fuel source 237 may be connected with each of the fuel injectors 116 by a common rail 239 or use unit injectors or the like and a plurality of supply passages 246. The internal combustion engine 100 may also comprise one or more sensors 247 to sense values indicative of engine speed or engine load or the like. The internal combustion engine 100 may also include a controller 250 hereinafter referred to as an engine control module (ECM) 250.

FIG. 2 illustrates a cross-section of one cylinder 114 and a piston 200 combination in more detail. The piston 200 is shown connected to the connecting rod 233 at its bottom end 252. The cylinder 114 is closed at its top end 254 by a cylinder head 255 to define a combustion chamber 257 between an upper end 258 of the piston 200 and the cylinder head 255. The piston 200 may be topped with a piston crown 260 at its upper end 258. The piston crown 260 may in turn include a circumferential wall 262 surrounding a bowl 264. The fuel injector 116 (schematically depicted) may be arranged to discharge fuel in a radially outward spray pattern 266 into the piston bowl 264 (see FIG. 5). The piston may also include a cylindrical base 268 from which the piston crown 260 upwardly extends and defines the piston bowl 264.

In normal operation of a diesel engine, when the piston 200 approaches the top dead center (TDC) within the cylinder as depicted in FIG. 2, air within space X will be squished into the piston bowl 264 from between the piston crown 260 and the cylinder head 255. But for the provisions of the present invention, this squish flow would follow the path of least resistance and not aid in the mixing of air and fuel.

However, as will be noted in FIG. 2, the present disclosure does many things to capitalize on such squish flow. For example, as shown, the cylinder head 255 is provided with a downwardly depending rim 280 that extends around a circumference of the cylinder head 255. In so doing, when the piston 200 reaches the TDC position, the squish air in space X is blocked radially inward by the rim 280, and radially outward by the cylinder 114. Moreover, the present disclosure provides passageways 290 communicating the squish air back to the combustion chamber 257 in a proactive manner. In addition, the geometry of the passageways 290 is such that the squish air is compressed in doing so, thereby increasing the velocity of the squish air and thus improving the mixing capability of the engine 100.

More specifically, the inventors have found that squish air velocities are ordinarily about ten to fifteen meters per second (m/s). By restricting where the squish air can go, through the use of passageways 290, and forcing the volume of air through smaller diameters, the passageways 290 cause the squish air velocity to greatly increase beyond ten to fifteen m/s. This flow of ordinarily unburned gases is then redistributed to areas of the combustion chamber 257 where it can be beneficially employed. As will also be appreciated from FIG. 2, the passageways 290 can be provided either in the piston 200 itself and or the cylinder head 255. In addition, while only shown on the left side of FIG. 2, the passageways 290 can be provided on the right side as well or any position around the circumference of the cylinder 114 and piston 200.

Turning to FIGS. 3 and 4, another embodiment of the present disclosure includes a topland groove 295 with the piston crown 260. This is another way that the present disclosure capitalizes on the squish air. More specifically, it will be seen that the topland groove 295 extends around the entire circumference of the piston 200. In so doing, the squish air is directed proactively toward one of the passageways 290 and is compressed before being re-introduced at a higher velocity back in the combustion chamber 257. A matching protrusion to the groove 295 could also be provided in the cylinder head 255 to create more of a volumetric compression and force the air through the passageways 290.

Figure 5:
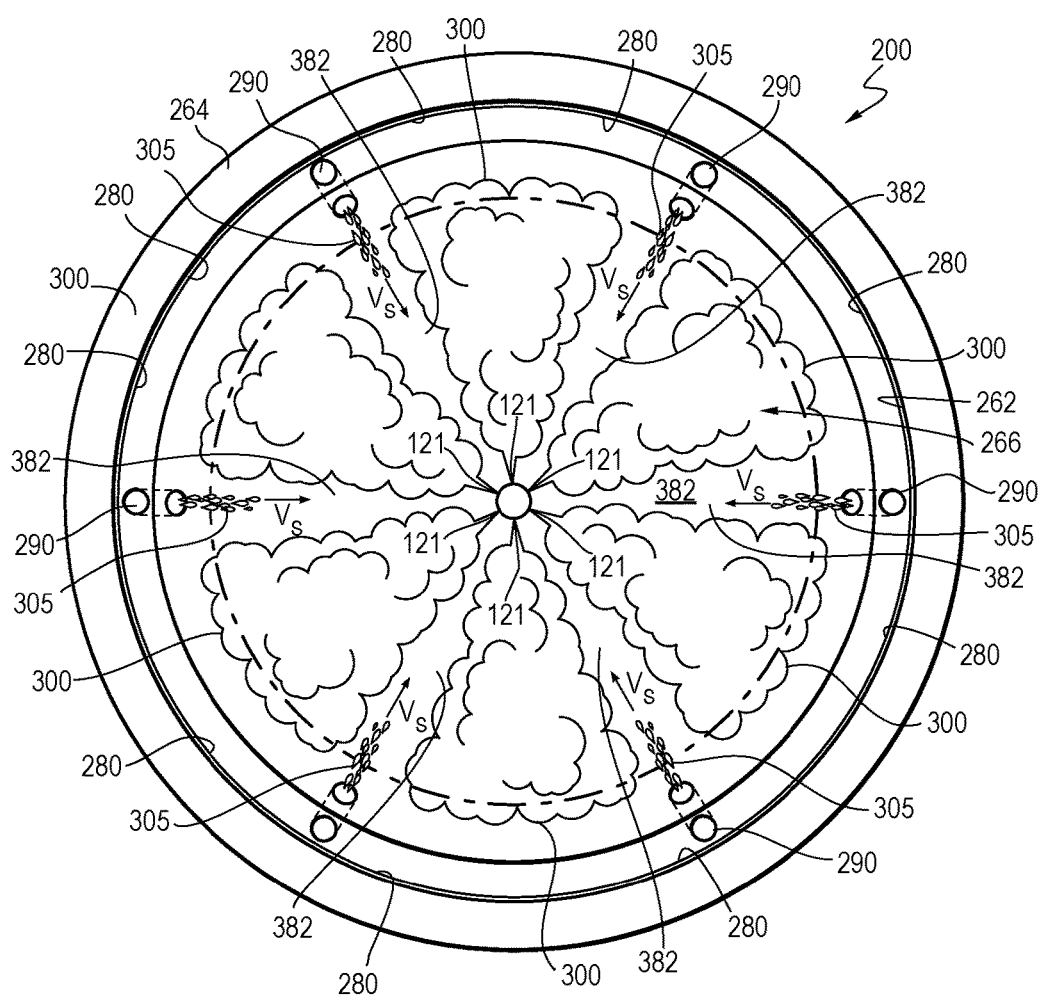
FIG. 5 is a top view of the piston of FIG. 4 and schematically showing the flow of flame plumes and squish flow in accordance with the present disclosure.

Referring now to FIG. 5, the enhanced combustion of the present disclosure is schematically depicted. When the piston 200 is proximate to the TDC position the fuel is injected and ignited, and a plurality of distinct flame plumes 300 extend radially outward from each injection orifice 121 toward the circumferential wall 262 as shown in the top view of FIG. 5. While six flame plumes 300 are illustrated, it is to be understood that the present disclosure is not limited to necessarily injecting only six flame plumes 300, as more or less may be provided. In any event, the flame plumes 300 are shown expanding as they move radially outward. Simultaneously, with such radially outward flame plume movement, squish flow 305 is also flowing as described above. More specifically, the squish flow 305 is compressed through the passageways 290 and re-introduced back into the combustion chamber 257 in a radially inward direction and at an elevated velocity. As depicted, the passageways 290 are provided in positions leading to mixing zones 382. The mixing zones 382 are provided between the flame plumes 300. However, the mixing zones 382 are not limited to being positioned between the flame plumes 300, and may be provided in other oxygen rich regions of the piston bowl 264. When the squish flow 305 interact with the flame plumes 300, a more complete and enhanced mixing is achieved leading to less soot emissions and more efficient engine operation. The present disclosure further improves upon the prior art in this regard by configuring the rim 280 around the circumference of the cylinder head 255 to block radial flow of squish air except through the passageways 290. The passageways 290 may then guide the squish flow 305 back into the piston bowl 264 to interact with the flame plumes 300 for improved mixture and combustion.

As also depicted in FIG. 5, the velocity $V_s$ of the squish flow 305 is increased as a result of the compression of the squish flow 305. After the squish flow 305 enters the passageway 290, the passageway 290 then guides the squish flow 305 back into the piston bowl 264. A curved path is illustrated for the passageway 290 in FIG. 2, but any shaped path that allows the squish flow 305 to travel continuously within the passageway 290 and back into the piston bowl 264 may be utilized. The passageway 290 may also have a variety of cross-sectional shapes and/or varying cross-sectional areas to provide a specific Vs at which the squish flow 305 travels back into the piston bowl 264.

Referring still to FIG. 5, after the squish flow 305 has come to the end of the passageway 290, the squish flow 305 may then exit the passageway 290. The squish flow 305 may then flow toward the flame plumes 300 within the combustion chamber 257. In the illustrated example in FIG. 5 shown above, each piston bowl 264 may have six flame plumes 300 travelling within the piston 200, but of course a greater or smaller number of flame plumes 300 may be possible. By configuring the rim 280 to downwardly depend from the cylinder head 255 to block the squish flow 305, and by providing the passageway 290 to receive and compress the squish flow 305, the squish flow 305 can be rerouted back into the piston bowl 264. When squish flow 305 is rerouted back into the piston bowl 264, greater mixing of oxygen and fuel is achieved. Accordingly, a beneficial result of the rim 280 blocking the squish flow 305 into the passageway 290 may be a greater mixing of oxygen and fuel within the piston 200 and thus a more efficient and complete combustion with less soot emissions.

INDUSTRIAL APPLICABILITY

In general, the present disclosure may find utility in various applications but not limited to the design and use of internal combustion engines such as Diesel engines. Such engines may be employed as earth movers, power generation, rail or marine equipment prime movers to improve combustion efficiency. The present disclosure does so by improving mixing of air and fuel, and capitalizes on enhanced squish flow. In so doing, the present disclosure decreases soot formation and or increases soot oxidation in the piston bowl 264 by increasing the mixture of the squish flow or unburned gas 305 with the flame plumes 300. More specifically, the present disclosure provides a rim 280 in the cylinder head 255 to block unwanted and undirected radial flow of the squish air 305 and proactively directing same to passageways 290. As a result, the squish flow 305 is compressed and re-enters the combustion chamber 257 at a higher velocity, and thereby aides in the mixing of the air and fuel. This in turn reduces soot emissions and improves engine efficiency.

Turning now to FIG. 6, an exemplary method 600 for operating an internal combustion engine 100 in accordance with the present disclosure is illustrated. Starting in block 601, the piston 200 is provided so as to reciprocate in the cylinder 114. The piston 200 is itself further provided with a piston crown 260 having a circumferential wall 262 and piston bowl 264. In a next block 602, a rim 280 is configured to downwardly depend from the cylinder head 255, and passageways 290 are configured within the circumferential wall 262 of the piston 200, and, or the cylinder head 255 as well. In alternative embodiments, the rim 280 could extend from the piston 200 or there could be a rim 280 on each. In addition, although defined as circular, the rim 280 could be other shapes as well.

The method of FIG. 6 may also include a block 603 wherein the piston 200 is driven to the top dead center position and a step 604 where the squish flow 305 is compressed by the piston 200 and forced through the passageways 290. In a block 605, the squish flow 305 is accelerated within the passageways 290 and reintroduced into the combustion chamber 257 as shown at block 606.

In block 607, the squish flow 305 exits the passageway 290 and interacts with the flame plumes 300 in the piston bowl 264. Accordingly, the squish flow 305 interacting with the flame plumes 300 allows for an increased mixing of air and fuel as a result. The operation of the engine 100 thus is more efficient with less soot emissions as well. The method of FIG. 6 may also be configured to concurrently perform and repeat the process described above in blocks 601-606 with respect to the other flame plumes 300 travelling within the piston bowl 264.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

What is claimed is:

1. An internal combustion engine comprising:
    an engine block having a cylinder disposed therein, an end of the cylinder being closed by a cylinder head;
    a piston disposed in reciprocating engagement with an internal surface of the cylinder,
        the piston including a piston crown that faces the cylinder head, the piston crown defining a piston bowl,
        the piston crown including an outer circumferential surface that directly faces the internal surface of the cylinder along a radial direction, and a top surface that extends from the outer circumferential surface to an inner circumferential surface of the piston bowl along the radial direction,
        the piston and the cylinder head defining a combustion chamber therebetween;
    a fuel injector disposed in fluid communication with the combustion chamber for delivering a fuel into the combustion chamber, the fuel creating a plurality of flames within the combustion chamber when ignited; and an annular rim extending beyond the top surface of the piston crown and toward the cylinder head along a longitudinal direction, the longitudinal direction extending from the piston toward the cylinder head and being perpendicular to the radial direction, the annular rim being disposed inside the piston bowl along the radial direction, at least one of the piston crown and cylinder head defining a plurality of flow passageways, the plurality of flow passageways being configured to guide a squish flow from between the top surface of the piston crown and the cylinder head to the piston bowl to enhance combustion by interacting with the plurality of flames within the piston bowl.

2. The internal combustion engine of claim 1, wherein the plurality of flow passageways includes a first flow passageway and a second flow passageway, the first flow passageway is defined by the piston crown, and the second flow passageway is defined by the cylinder head.

3. The internal combustion engine of claim 1, wherein the annular rim is in direct contact with the piston crown.

4. The internal combustion engine of claim 1, wherein each passageway of the plurality of passageways is disposed entirely within the piston crown.

5. The internal combustion engine of claim 1, wherein the top surface of the piston crown includes a topland groove.

6. The internal combustion engine of claim 5, wherein the plurality of passageways is in direct fluid communication with with the topland groove.

7. The internal combustion engine of claim 1, wherein at least one passageway of the plurality of passageways extends from an inlet that is defined by the top surface of the piston crown to an outlet that is defined by the piston bowl, and the inlet is disposed outside the outlet along the radial direction.

8. The internal combustion engine of claim 1, wherein at least one passageway of the plurality of passageways extends from an inlet that is defined by the cylinder head to an outlet that is defined by the cylinder head, the inlet directly faces the top surface of the piston crown, the outlet directly faces the piston bowl, and the inlet is disposed outside the outlet along the radial direction.

9. A piston comprising:

a cylindrical base; and a crown disposed on the cylindrical base, the crown defining a piston bowl, the crown including an outer circumferential surface that faces away from an inner circumferential surface of the piston bowl along a radial direction, and a top surface that extends from the outer circumferential surface to the inner circumferential surface of the piston bowl along the radial direction, an annular rim extending beyond the top surface of the crown along a longitudinal direction, the longitudinal direction extending from the cylindrical base toward the crown and being perpendicular to the radial direction, the annular rim being disposed inside the piston bowl along the radial direction, the crown defining a flow passageway that is configured to guide a squish flow from the top surface of the crown to the piston bowl.

10. The piston of claim 9, wherein the passageway has a converging flow area between the top surface of the crown and the piston bowl to accelerate the squish flow between the top surface of the crown and the piston bowl.

11. The piston of claim 9, wherein the passageway extends from an inlet that is defined by the top surface of the crown to an outlet that is defined by the piston bowl, and the inlet is disposed outside the outlet along the radial direction.

12. A method for operating an internal combustion engine, the method comprising:

providing a piston within a cylinder, and closing an end of the cylinder with a cylinder head, the piston and the cylinder head defining a combustion chamber therebetween, the piston including a cylindrical base; and a crown disposed on the cylindrical base, the crown defining a piston bowl, the crown including an outer circumferential surface that faces away from an inner circumferential surface of the piston bowl along a radial direction, and a top surface that extends from the outer circumferential surface to the inner circumferential surface of the piston bowl along the radial direction, an annular rim extending beyond the top surface of the crown along a longitudinal direction, the longitudinal direction extending from the cylindrical base toward the crown and being perpendicular to the radial direction, the annular rim being disposed inside the piston bowl along the radial direction, the crown defining a flow passageway that is configured to guide a squish flow from the top surface of the crown to the piston bowl;

driving the piston to a top dead center position;

driving a squish flow from the top surface of the crown to the piston bowl via the passageway while the piston is located at the top dead center position; and interacting the squish flow with a plurality of flames within the combustion chamber.

13. The method of claim 12, wherein the passageway is configured to follow at least one of a curved path and a straight path.

14. The method of claim 12, wherein a velocity of the squish flow is accelerated along the passageway before interacting with the plurality of flames.

15. The method of claim 12, further comprising effecting a plurality of mixing zones to mix the squish flow with the plurality of flames in the combustion chamber.

16. The method of claim 12, wherein the passageway extends from an inlet that is defined by the top surface of the crown to an outlet that is defined by the piston bowl, and the inlet is disposed outside the outlet along the radial direction.

* * * * *